United States Patent
Ehman et al.

(10) Patent No.: US 10,466,047 B2
(45) Date of Patent: Nov. 5, 2019

(54) BAROMETRIC SENSOR INTEGRATION IN A WATER RESISTANT ELECTRONIC DEVICE

(71) Applicant: Apple Inc., Cupertino, CA (US)

(72) Inventors: Rex T. Ehman, San Jose, CA (US); William C. Lukens, San Francisco, CA (US); David M. Pelletier, Cupertino, CA (US); Henry H. Yang, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 15/263,316

(22) Filed: Sep. 12, 2016

(65) Prior Publication Data

US 2017/0089698 A1    Mar. 30, 2017

Related U.S. Application Data

(60) Provisional application No. 62/234,971, filed on Sep. 30, 2015.

(51) Int. Cl.
*G01L 19/00* (2006.01)
*G01L 9/00* (2006.01)
*G01C 5/06* (2006.01)
*G01L 19/14* (2006.01)

(52) U.S. Cl.
CPC .............. *G01C 5/06* (2013.01); *G01L 9/0041* (2013.01); *G01L 19/0038* (2013.01); *G01L 19/14* (2013.01)

(58) Field of Classification Search
CPC ........ G01C 13/008; G01C 5/06; G04G 21/02; B63C 11/32; B63C 2011/021; B63C 11/02; G04C 17/0091; G01L 19/0672; G01L 9/04; G01L 9/0072; G01L 9/0077; G01L 19/14
See application file for complete search history.

(56) References Cited

U.S. PATENT DOCUMENTS

| | | | | |
|---|---|---|---|---|
| 5,279,164 A | * | 1/1994 | Araki | G01L 19/147 338/4 |
| 6,311,561 B1 | * | 11/2001 | Bang | G01L 9/0073 73/708 |
| 6,754,137 B1 | * | 6/2004 | Bourquin | G04C 17/0091 368/10 |
| 8,399,764 B2 | | 3/2013 | Klosky | |

(Continued)

*Primary Examiner* — Brandi N Hopkins
(74) *Attorney, Agent, or Firm* — Dickinson Wright RLLP

(57) ABSTRACT

An electronic device having a pressure sensor configured to determine pressure is disclosed. The electronic device includes an enclosure defining an internal volume. The enclosure may include a sidewall with an external opening that provides a vent for the internal components. To reduce the response of the pressure sensor (that is, the time required to detect a pressure change), the pressure sensor may secure with an internal wall of the enclosure. Further, the internal wall includes an opening defining an air pocket significantly smaller than the internal volume. When the pressure sensor is mounted to receive air via the air pocket, the pressure sensor may respond faster to pressure changes, as compared to receiving air circulating throughout the internal volume. This is due in part to an amount of airflow passing through the air pocket causing a greater pressure change throughout the air pocket as compared to the internal volume.

19 Claims, 8 Drawing Sheets

(56) References Cited

U.S. PATENT DOCUMENTS

| | | | |
|---|---|---|---|
| 2005/0204732 A1* | 9/2005 | Kouzu | F01N 3/22 60/307 |
| 2009/0293628 A1* | 12/2009 | Brown | G01L 9/0055 73/723 |
| 2012/0034109 A1* | 2/2012 | Tout | F04B 43/046 417/313 |
| 2013/0056100 A1* | 3/2013 | Imaizumi | B60T 13/662 137/560 |
| 2013/0209281 A1* | 8/2013 | Locke | F04B 51/00 417/63 |
| 2014/0069514 A1 | 3/2014 | Peng | |
| 2017/0067790 A1* | 3/2017 | Takeuchi | G01L 9/0052 |
| 2017/0089795 A1* | 3/2017 | Perkins | G01L 19/0672 |

\* cited by examiner

BAROMETRIC SENSOR INTEGRATION IN A WATER RESISTANT ELECTRONIC DEVICE

CROSS-REFERENCE TO RELATED APPLICATION(S)

This application claims the benefit of priority under 35 U.S.C. § 119(e) to U.S. Provisional Application No. 62/234,971, filed on Sep. 30, 2015, and titled "BAROMETRIC SENSOR INTEGRATION IN A WATER RESISTANT ELECTRONIC DEVICE," the disclosure of which is incorporated herein by reference in its entirety.

FIELD

The following description relates to an electronic device having a pressure sensor in an enclosure, or housing, of the electronic device. In particular, the following description relates to a pressure sensor used to detect a pressure change, which may occur when the electronic device undergoes an elevation change. The pressure sensor may be positioned in the electronic device against a wall of the enclosure so as to expose the pressure sensor to a relatively small air volume. Movement of air through the small volume may result in a greater pressure change, as compared to the same amount of air moving through the enclosure, which may decrease response times of the pressure sensor to the pressure changes. As a result, the pressure sensor can more quickly detect pressure changes.

BACKGROUND

An electronic device may include sensing devices used to detect certain environmental conditions. Some sensing devices, such as pressure sensors, require an opening, or openings, in order to receive air to determine the pressure. However, by increasing the number of openings, the likelihood of exposure to liquid ingress in the electronic device increases, thereby increasing the likelihood of damage to the electronic device.

In order to reduce the number of openings, the pressure sensor can be centrally located within the electronic device and rely upon air from an existing opening. However, in order for the pressure sensor to accurately and quickly determine pressure sensor, air passing through the existing opening much reach the pressure sensor. This may lead to slower response times for the pressure sensor, as the pressure sensor may not determine pressure changes until the air fully circulates throughout the electronic device.

SUMMARY

In one aspect, an electronic device is described. The electronic device may include an enclosure defining a first volume. The enclosure may include an opening. The electronic device may further include a pressure sensor secured within the enclosure at the opening. The electronic device may further include a membrane covering the opening to define a second volume less than the first volume. In some embodiments, the pressure sensor detects pressure based on air within the second volume.

In another aspect, an electronic device is described. The electronic device may include an enclosure that includes a rear wall and sidewalls that combine with the rear wall to define an internal volume. The sidewalls may include a sidewall having an external opening. The enclosure may include an internal wall covered by the sidewall and having an internal opening. The electronic device may further include a pressure sensor secured with the enclosure at the internal opening. In some embodiments, the pressure sensor combines with the internal opening to define an air pocket having a volume less than the internal volume. Also, in some embodiments, the pressure sensor is configured to detect air pressure from air entering the air pocket.

In another aspect, a method for forming an electronic device is described. The electronic device may include an enclosure that includes a rear wall and sidewalls that combine with the rear wall to form a first volume. The sidewalls may include a sidewall having a first opening. Also, the enclosure may further include an internal wall hidden by the sidewall and having a second opening. The method may include providing a pressure sensor secured within the internal wall at the opening. The method may further include covering the second opening with a membrane defining a second volume less than the first volume. In some embodiments, the pressure sensor detects pressure based on air within the second volume.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
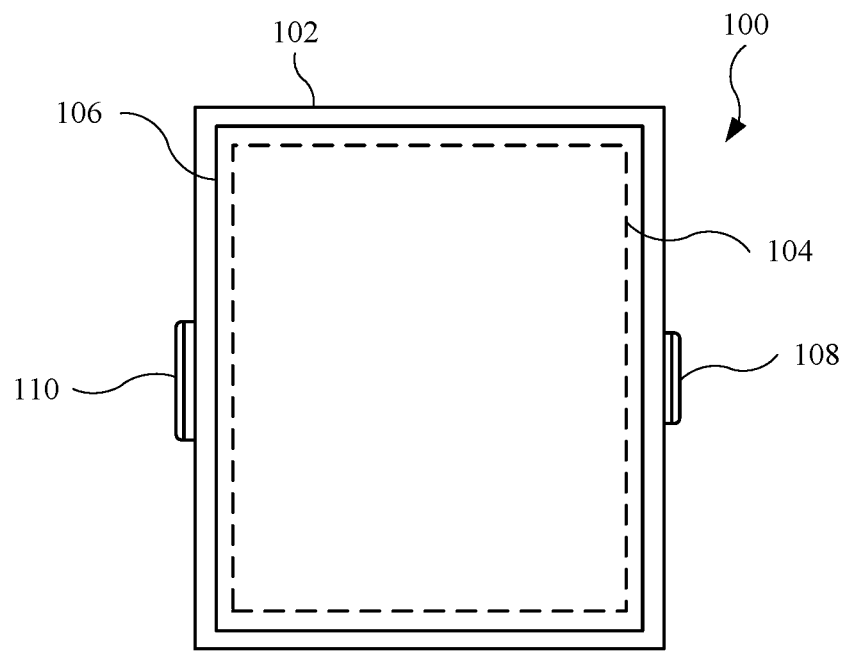
FIG. 1 illustrates a front view of an embodiment of an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device having a pressure sensor, or barometric sensor, disposed in an enclosure of the electronic device. The pressure sensor is designed to monitor pressure, including pressure changes, exerted on the electronic device. In order to do, the enclosure includes an opening to receive ambient air. During a pressure change, air enters or exits the opening, causing the pressure sensor to detect the pressure change. When the pressure sensor is centrally located, or approximately centrally located, in the enclosure, the air must pass through the opening, during a pressure increase, to reach the pressure sensor. This may result in a time delay, as a sufficient amount of airflow is required for the pressure sensor to determine a pressure change. Conversely, a sufficient amount of air is required to exit the enclosure, during a pressure decrease, through the opening before the pressure sensor determines a pressure change.

Rather than requiring ambient air to circulate throughout the internal volume of the enclosure, in the present embodiments, the pressure sensor can be mounted in the enclosure such that the pressure sensor is exposed to a relatively small volume, as compared to the internal volume of the enclosure. As an example, the pressure sensor can be mounted to an opening in a sidewall or an internal wall of the enclosure, with the opening used to define in part the small volume. The small volume may be designed to include a volume that is approximately one-tenth the volume defined by the internal volume of the enclosure. In this regard, an amount of air volume required to pass into or out of the small volume to cause a pressure change registered by the pressure sensor can be significantly reduced. This is due in part to an amount of air passing through the small volume causing a greater pressure change as compared to the same amount of air passing through the internal volume. Accordingly, the small volume can contribute to decreased response time, or a smaller delay, of the pressure sensor so that the pressure sensor reacts more quickly to pressure changes.

In some embodiments, the sidewall includes an external opening that provides a vent for the electronic device. Further, the enclosure may include an internal wall having several internal openings, each of which can receive air via the external opening. For example, the internal wall may include a first internal opening. The pressure sensor may be mounted to the internal wall such that the first internal opening forms a small volume to receive air used by the pressure sensor to determine a pressure change. The internal wall may also include a second internal opening that allows air to circulate throughout an internal volume of the electronic device defined by the enclosure. Accordingly, the first internal opening may form in part a small volume, compared to the internal volume, and only a small amount of air is required to pass through the small volume for the pressure sensor to determine a pressure change.

Also, in order to prevent water from passing through the internal openings, an air-permeable, water-resistant membrane may cover the internal openings. Accordingly, the membrane may prevent damage caused by ingress of liquids that would otherwise continue through the aforementioned internal opening, while also allow air to vent through both the internal volume of the enclosure and the small volume used by the pressure sensor. Further, the membrane may be adhesively secured with the enclosure by an airtight adhesive, thereby separating the first internal opening from the second internal opening.

An electronic device that provides a small volume used by the pressure sensor may include several advantages. For instance, a user may use the electronic device as an activity tracker. The activity tracker may run a software application, or "app," that determines an activity level based upon the user's activities. The activity level may depend in part on the user's elevation. In order to more accurately determine the user's activity levels, it may be useful for the electronic device to respond quickly to elevation changes, which is related to pressure changes, as air pressure tends to decrease with increased elevation, and increase with decreased elevation. The pressure sensor, exposed to a relatively small volume of air, may respond more quickly to air pressure changes, making it more responsive to elevation changes. Accordingly, when the software application uses the elevation to determine the user's activity levels, the pressure sensor may provide the software application with a faster pressure determination.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 illustrates a plan view of an embodiment of an electronic device 100, in accordance with the described embodiments. In some embodiments, the electronic device 100 is a tablet device. In other embodiments, the electronic device 100 is a mobile wireless communication device, such as a smartphone. Still, in other embodiments, the electronic device 100 is a wearable electronic device, similar to a watch. When the electronic device 100 is a wearable electronic device, the electronic device 100 may include one or more bands (not shown) designed to wrap around an appendage (a wrist, for example) of a user.

As shown, the electronic device 100 may include an enclosure 102. In some embodiments, the enclosure 102 is formed from a metal, which may include aluminum, stainless steel, or ceramic, as non-limiting examples. In other embodiments, the enclosure 102 includes a metal alloy. The enclosure 102 may include a rear wall that joins with several sidewalls to form an internal cavity, or internal volume, designed to carry several operational components (not shown), such as a speaker module, a microphone, a processor circuit, a memory circuit, and a battery, as non-limiting examples. The electronic device 100 may further include a display assembly 104 (shown as a dotted line) designed to present visual information. The display assembly 104 may include a touch-sensitive display assembly designed to respond to a capacitive coupling with the display assembly 104. The electronic device 100 may further include a protective cover 106 that overlays the display assembly 104. The protective cover 106 may include a material, such as glass or sapphire, that provides a transparent protective layer for the display assembly 104.

Also, the electronic device 100 may include one or more input features, such as a first input 108 and a second input 110. The first input 108 and/or the second input 110 may include a dial designed to rotate and provide an input to the electronic device 100 by rotation. Alternatively, or in combination, the first input 108 and/or the second input 110 may include a button designed to depress, in response to a force, in a direction toward the enclosure 102 and provide an input to the electronic device 100 by the depression. The first input 108 and/or the second input 110 may be used to generate an input or command to a processor circuit (not shown) in the electronic device 100. In response to the input or command, the processor circuit may use an executable program stored on a memory circuit (not shown) to change the visual information displayed on the display assembly 104. Also, the electronic device 100 may include one or more radio circuits (not shown) that provide the electronic device 100 with wireless communication capabilities, through means such as Bluetooth or 802.11 (Wi-Fi) protocol, to connect to a network as well as pair with an additional electronic device.

Figure 2:
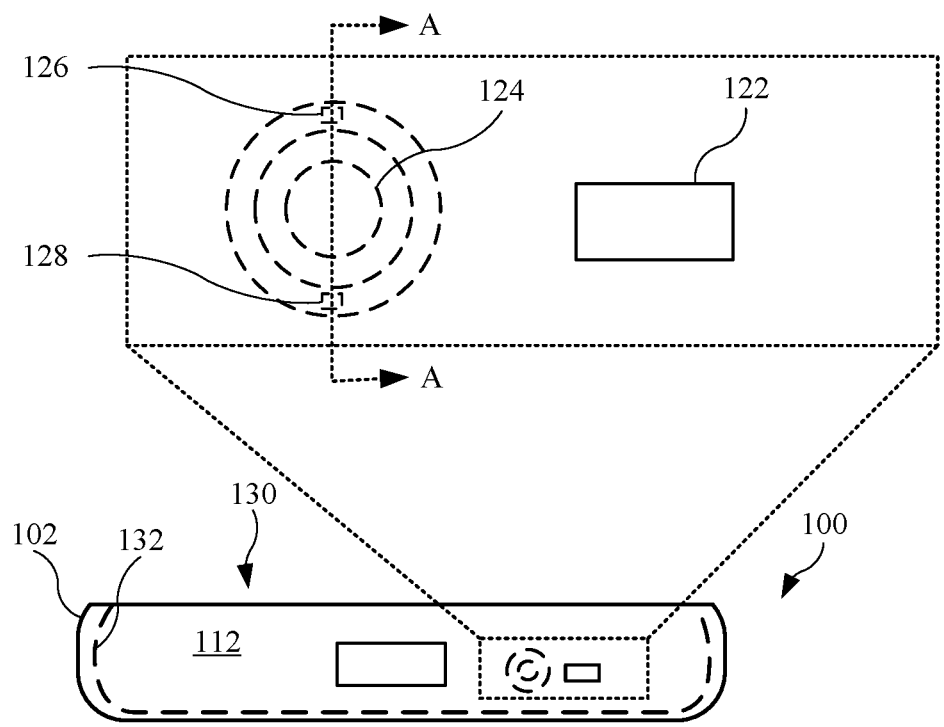
FIG. 2 illustrates a side view of the electronic device shown in FIG. 1, showing several openings of the enclosure.

FIG. 2 illustrates a side view of the electronic device 100 shown in FIG. 1, showing several openings of the enclosure 102. The display assembly 104 and the protective cover 106 (both shown in FIG. 1) are removed. As shown in the enlarged view, the enclosure 102 includes a sidewall 112 having an external opening 122. An "external opening" may be referred to as an opening through an exterior surface of the enclosure 102, such as a sidewall opening, with the exterior surface being visible when viewing the electronic device 100. In some embodiments, the external opening 122 provides a pathway for acoustical energy in the form of audible sound from a speaker module (not shown) disposed in the enclosure 102. In other embodiments, the external opening 122 is used for an operational component, such as a microphone designed to capture acoustical energy through the external opening 122. Also, in some embodiments, the enclosure 102 includes at least two openings, each of which may be designed for use with a speaker module and a microphone in a manner previously described.

The enclosure 102 may further include several internal openings. For example, as shown in the enlarged view, the enclosure 102 may include a first internal opening 124, a second internal opening 126, and a third internal opening 128. An "internal opening" may be referred to as an opening through an internal wall located in an internal volume 130 of the enclosure 102 (denoted by the dotted line 132) and covered or hidden by the sidewall 112. The aforementioned internal openings are shown as dotted lines and positioned behind a sidewall of the enclosure 102, and accordingly, are not visible when viewing the electronic device 100 (when the electronic device 100 is assembled).

The external opening 122 may open to both the first internal opening 124, the second internal opening 126, and the third internal opening 128, and accordingly, the external opening 122 may allow airflow into or out of the aforementioned internal openings. In some embodiments, the first internal opening 124, in conjunction with the external opening 122, provides a vent for use with a pressure sensor (not shown). For example, the pressure sensor is exposed to ambient air by way of the external opening 122 and the first internal opening 124. Moreover, the first internal opening 124 may allow airflow only to the aforementioned pressure sensor. This will be shown below. Also, in some embodiments, the second internal opening 126 and the third internal opening 128, in conjunction with the external opening 122, provide a vent to the internal volume 130 of the enclosure 102. In this regard, the internal volume 130 is exposed to ambient air by way of the external opening 122, the second internal opening 126, and the third internal opening 128.

Figure 3:
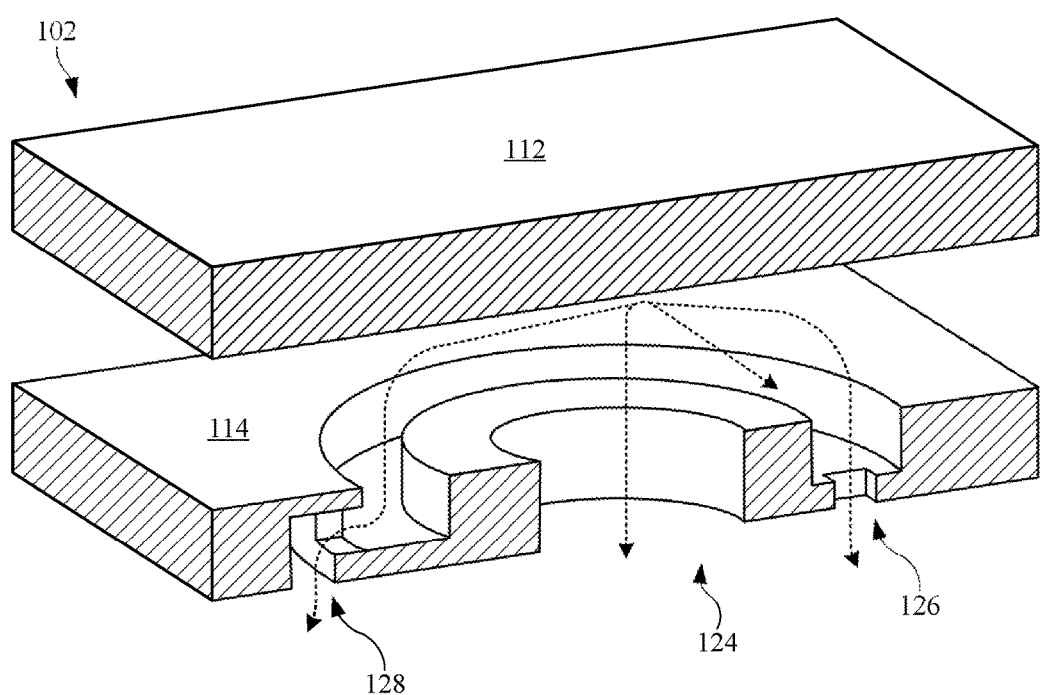
FIG. 3 illustrates a partial cross sectional view of the interior region the enclosure shown in FIG. 2, taken along line A-A in FIG. 2, showing the internal openings.

FIG. 3 illustrates a partial cross sectional view of the enclosure 102 shown in FIG. 2, taken along line A-A in FIG. 2, showing the internal openings. As shown, the first internal opening 124, the second internal opening 126, and the third internal opening 128 are formed in an internal wall 114 that is covered by the sidewall. Accordingly, the sidewall 112, representing an exterior surface of the enclosure 102, may cover the first internal opening 124, the second internal opening 126, and the third internal opening 128. Also, the first internal opening 124 is generally cylindrical in shape. However, the shape (and size) of the first internal opening 124 may vary. In particular, the first internal opening 124 may include a size and a shape to accommodate a pressure sensor. This will be shown below. The second internal opening 126 and the third internal opening 128 may be disposed in a grooved region of the interior region of the enclosure 102, as shown in FIG. 2. Also, the second internal opening 126 and the third internal opening 128 may open to the internal volume 130 of the enclosure 102 (shown in FIG. 2).

The dotted lines shown in FIG. 3 depict various paths of airflow the first internal opening 124, the second internal opening 126, and the third internal opening 128. Each of the aforementioned internal openings may receive air from the external opening 122 (shown in FIG. 2). Also, air passing through the first internal opening 124 may define a vent or air path used with the aforementioned pressure sensor, while air passing through the second internal opening 126 and/or the third internal opening 128 may define a vent or air path for the internal volume 130 (shown in FIG. 2). While a discrete number of internal openings are shown, several additional internal openings (not shown) may be used. Also, in some embodiments, the second internal opening 126 is formed in the grooved region allowing the air to pass directly into the internal volume 130, while the third internal opening 128 is formed in a lateral surface of the grooved region such that the air takes a lateral path to enter the internal volume 130.

Figure 4:
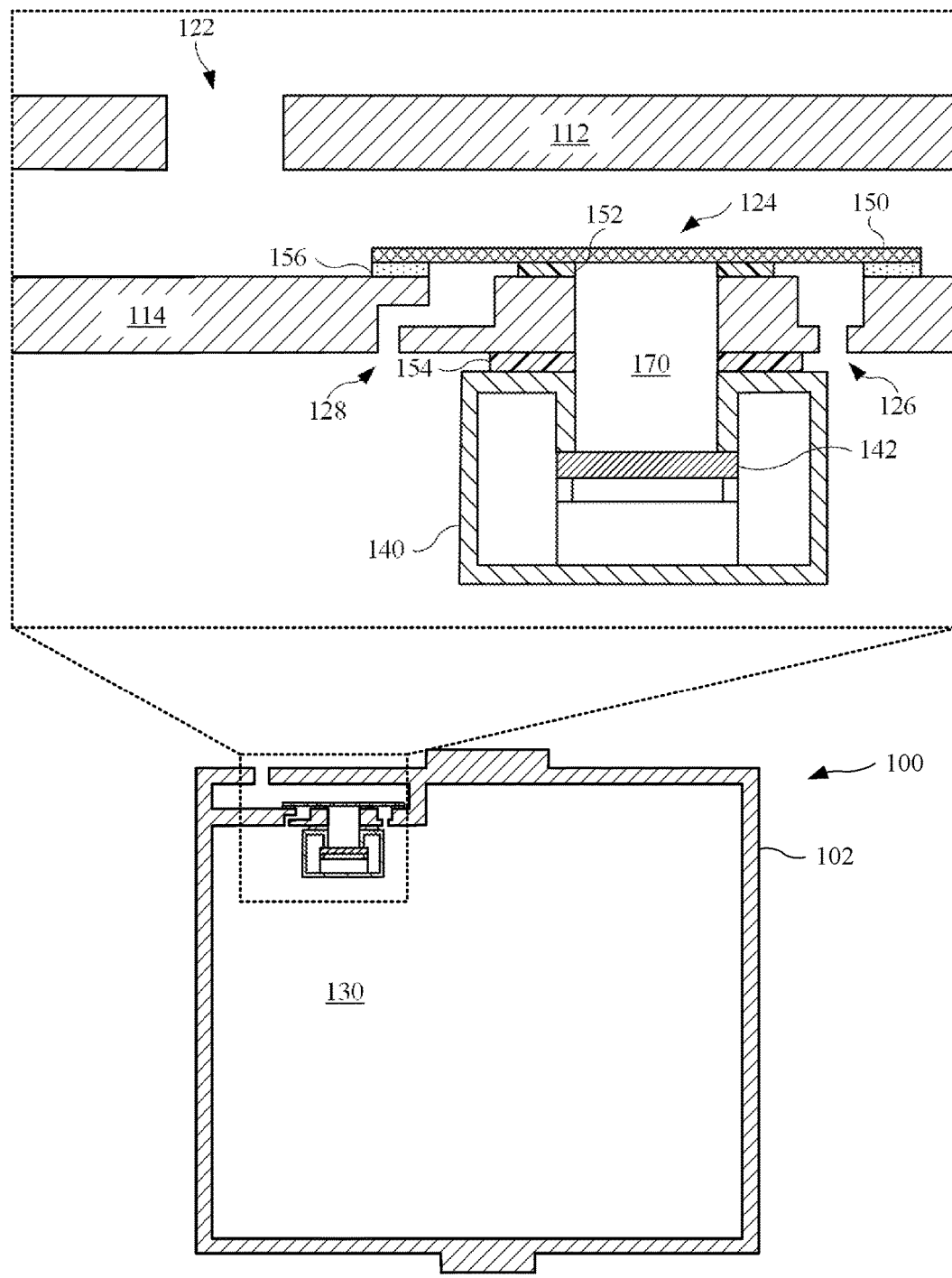
FIG. 4 illustrates a cross sectional view of the electronic device shown in FIG. 2, further showing the electronic device having a pressure sensor secured with the internal wall.

FIG. 4 illustrates a cross sectional view of the electronic device 100 shown in FIG. 2, further showing the electronic device 100 having a pressure sensor 140 secured with the internal wall 114. For purposes of simplicity, several internal components are removed from the electronic device 100. As shown in the enlarged view, the pressure sensor 140 includes a diaphragm 142 designed to bend or flex in response to air pressure, including changes in air pressure. For example, the diaphragm 142 may bend away from the internal wall 114 during a pressure increase, and may bend toward the internal wall 114 during a pressure decrease. Further, the pressure sensor 140 is secured and aligned with the internal wall 114 such that the diaphragm 142 is exposed to air via the first internal opening 124 (in conjunction with the external opening 122). Also, air entering or exiting the external opening 122 may also enter or exit, respectively, the internal volume 130 by way of the second internal opening 126 and/or the third internal opening 128.

The internal wall 114 may include a membrane 150 covering the first internal opening 124, the second internal opening 126, and the third internal opening 128. In some embodiments, the membrane 150 includes a water-resistant membrane designed to allow air, but not water, through the material defining the membrane 150. In this regard, the membrane 150 may be formed from polytetrafluoroethylene ("PTFE"). Also, the membrane 150 may be formed from a Teflon material. The membrane 150 may be secured with the internal wall 114 by a first adhesive layer 152. Also, the pressure sensor 140 may be secured with the internal wall 114 by a second adhesive layer 154. The first adhesive layer 152 and the second adhesive layer 154 may include an airtight adhesive. As shown, the first adhesive layer 152 and the second adhesive layer 154 are positioned to separate air (received by the external opening 122) flowing into (or out of) the first internal opening 124 from air flowing into (or out of) the second internal opening 126 and the third internal opening 128. In this manner, air received through the first internal opening 124 and the membrane 150 passes directly to the pressure sensor 140, and air passing through the second internal opening 126 and/or the third internal opening 128 flows into the internal volume 130. In addition, the membrane 150 may be further adhesively secured with the internal wall 114 by a third adhesive layer 156 that extends around the internal openings. The third adhesive layer 156 may include a waterproof adhesive designed to combine with the membrane 150 to shield the pressure sensor 140 and prevent liquid ingress from passing through the aforementioned internal openings.

In some embodiments, the pressure sensor 140 combines with the first internal opening 124 to define an air pocket 170. The first adhesive layer 152 and the second adhesive layer 154 may also define in part the air pocket 170. The air pocket 170 may include a volume or space that receives air passing through the membrane 150 and the first internal opening 124. When the pressure sensor 140 is positioned next to the first internal opening 124 (as shown in FIG. 4), the pressure sensor 140, and in particular the diaphragm 142, uses the air in the air pocket 170 to determine air pressure.

As illustrated in FIG. 4, the air pocket 170 includes a volume that is significantly less than that of the internal volume 130 of the enclosure 102. In some instances, the size of the air pocket 170 is one-tenth, or approximately one-tenth, of the size of the internal volume 130. As a result, the amount of air required to fill the air pocket 170 is significantly less than the amount of air required to fill the internal volume 130. Further, assuming the rate of airflow is the same (as both the air pocket 170 and the internal volume 130 receive and expel air via the external opening 122), the time required to fill the air pocket 170 (or expel air from the air pocket 170) is significantly less than the time required to fill the internal volume 130 (or expel air from the internal volume 130). Accordingly, the pressure change within the air pocket 170 is greater than the pressure change within the internal volume 130, for the same amount of air entering (or exiting) the air pocket 170 and the internal volume 130. In this regard, by mounting the pressure sensor 140 in a manner such that the diaphragm 142 is exposed to airflow only from the air pocket 170, the pressure sensor 140 may experience a pressure change more quickly, as the amount of air volume in the air pocket 170 required for the pressure sensor 140 to determine a pressure change is reduced. In other words, the air pocket 170 and associated increased (relatively) pressure change may cause the pressure sensor 140 to respond more quickly, and the pressure sensor 140 provides the electronic device 100 with a faster response to pressures changes.

Figure 5:
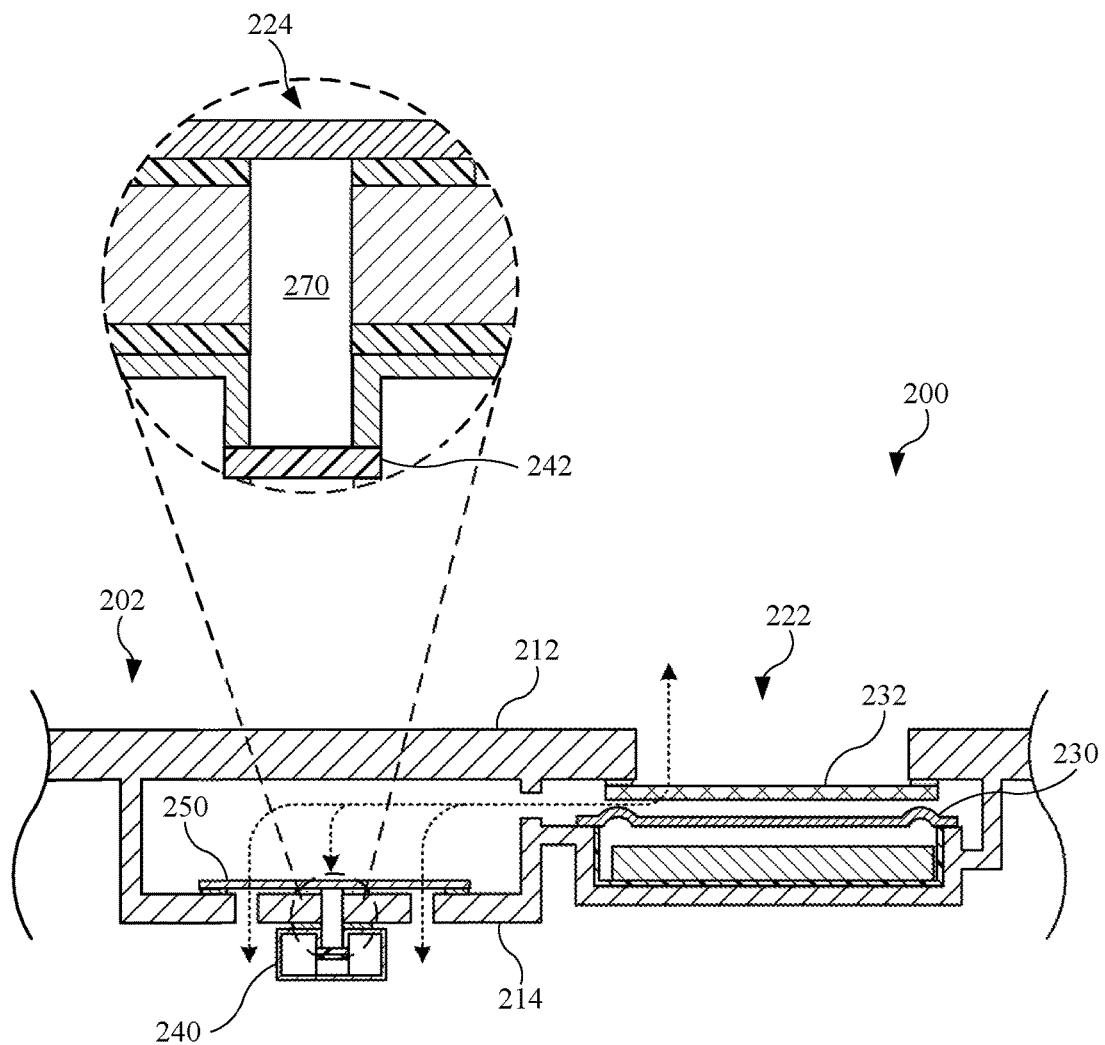
FIG. 5 illustrates a cross sectional view of an alternate embodiment of an electronic device, showing an operational component and a pressure sensor sharing an opening of the enclosure, in accordance with the described embodiments.

FIG. 5 illustrates a cross sectional view of an alternate embodiment of an electronic device 200, showing an operational component 230 and a pressure sensor 240 sharing an external opening 222 of the enclosure 202, in accordance with the described embodiments. The electronic device 200 may include any feature or features previously described for an electronic device. As shown, the external opening 222 is formed in a sidewall 212, allowing air to enter or exit the enclosure 202 via the external opening 222. Also, the external opening 222 may be used by the operational component 230 for purposes of audio transmission. For example, as shown, the operational component 230 may include an audio speaker designed to drive audible sound through the external opening 222 by way of a porous material 232, which may include mesh. However, although not shown, in some embodiments, the operational component 230 includes a microphone designed to receive audible sound.

Also, the enclosure 202 may further include an internal wall 214 and a pressure sensor 240 secured with the internal wall 214. The internal wall 214 may include a membrane 250 covering several internal openings of the internal wall 214. For example, the internal wall 214 may include an internal opening 224 defining an air pocket 270 that exposes the pressure sensor 240 to air passing through the external opening 222. The membrane 250 may include a water-resistant membrane that allows to air, but not water, to pass through the membrane 250. Accordingly, the membrane 250 may allow the electronic device 200 to take the form of a water-resistant electronic device by restricting the flow of aqueous-based solutions through the membrane 250.

As shown in the enlarged view, the air pocket 270 is bounded by at least the membrane 250, the internal wall 214, and the pressure sensor 240. Also, the pressure sensor 240, and in particular, a diaphragm 242 of the pressure sensor 240, may use the air pocket 270 to detect air pressure exerted on the electronic device 200, with the diaphragm 242 bending or flexing in response to changes in air pressure. For example, the diaphragm 242 may bend in a direction away from a space defined by the air pocket 270 in response to a pressure increase, and may bend in a direction toward a space defined by the air pocket 270 in response to a pressure decrease. The air pocket 270 may represent a volume or space significantly smaller than that of an internal volume (not shown) of the electronic device 200.

Although not shown, the pressure sensor 240 may be in electrical communication with a processor circuit of the electronic device 200. The pressure sensor 240 may determine the pressure and send pressure information to the processor circuit. Alternatively, the pressure sensor 240 may communicate with the processor circuit by sending an electrical signal, such as several pulses of electrical current at a predetermined frequency or an analog current signal. The processor circuit may then use a program or algorithm stored on a memory circuit (not shown) to determine the pressure based upon the communication with the pressure sensor 240.

Figure 6:
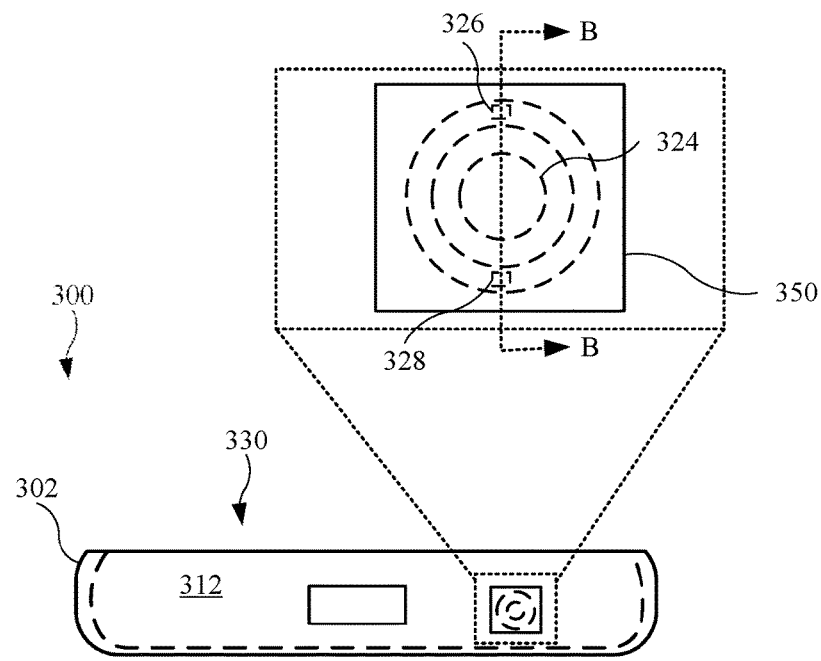
FIG. 6 illustrates a side view of an alternate embodiment of an electronic device, showing an enclosure having a sidewall and a membrane secured the sidewall.

FIG. 6 illustrates a side view of an alternate embodiment of an electronic device 300, showing an enclosure 302 having a sidewall 312 and a membrane 350 secured the sidewall 312. The display assembly and protective cover are removed. The membrane 350 may include an air-permeable, water-resistant membrane, and further, may include any material previously described for a membrane. As shown in the enlarged view, the sidewall 312 may include several external openings, each of which is covered by the membrane 350. For example, the sidewall 312 may include a first opening 324, a second opening 326, and a third opening 328. The first opening 324 may provide an air to a pressure sensor (not shown) disposed in the enclosure 302, and in particular, an internal volume 330 of the enclosure 302. The second opening 326 and the third opening 328 may provide a pathway for acoustical energy in the form of audible sound from a speaker module (not shown) disposed in the enclosure 302. Alternatively, or in combination, the second opening 326 and the third opening 328 may provide a vent for the enclosure 302. With the openings of the enclosure 302 covered by the membrane 350, the opening may be protected from water ingress while providing air paths for the electronic device 300.

Figure 7:
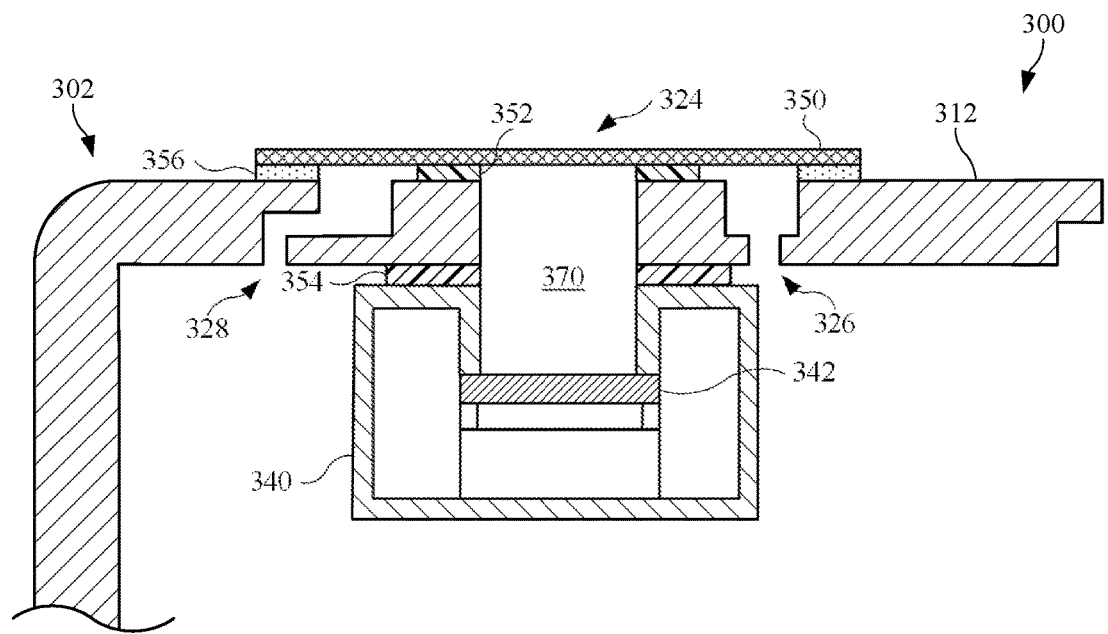
FIG. 7 illustrates a partial cross sectional view of the electronic device shown in FIG. 6, taken along line B-B in FIG. 3, showing the openings of the sidewall.

FIG. 7 illustrates a partial cross sectional view of the electronic device 300 shown in FIG. 6, taken along line B-B in FIG. 6, showing the aforementioned openings of the sidewall 312. As shown, a pressure sensor 340 is secured with the sidewall 312. Further, the pressure sensor 340 is positioned on the sidewall 312 such that a diaphragm 342 of the pressure sensor 340 is aligned with the first opening 324, with the diaphragm 342 designed to bend or flex in response to air passing to and from the first opening 324. Also, air entering or exiting the second opening 326 and/or the third opening 328 may also enter or exit, respectively, the internal volume 330 (shown in FIG. 6).

The membrane 350 may be secured with an exterior surface of the sidewall 312 by a first adhesive layer 352. Also, the pressure sensor 340 may be secured with an interior surface of the sidewall 312 by a second adhesive layer 354. As shown, the first adhesive layer 352 and the second adhesive layer 354 are positioned to separate air passing through the membrane 350 and flowing into (or out of) the first internal opening 124 from air flowing into (or out of) the second opening 326 and the third opening 328. In this manner, air received through the first opening 324 passes directly to the pressure sensor 340, and air passing through the second opening 326 and/or the third opening 328 flows into the internal volume 330. In addition, the membrane 350 may be further adhesively secured with the sidewall 312 by a third adhesive layer 356 that extends around openings. The third adhesive layer 356 may include a waterproof adhesive designed to combine with the membrane 350 to shield the pressure sensor 340 and prevent liquid ingress from passing through the aforementioned openings.

The pressure sensor 340 may combine with the first opening 324 to define an air pocket 370 having a volume that is significantly less than that of the internal volume 330 of the enclosure 302. In this regard, by mounting the pressure sensor 340 in a manner such that the diaphragm 342 is exposed to airflow only from the air pocket 370 (as compared to another location of the internal volume 330), the pressure sensor 340 may experience a pressure change more quickly, as the amount of air volume in the air pocket 370 required for the pressure sensor 340 to determine a pressure change is reduced.

Figure 8:
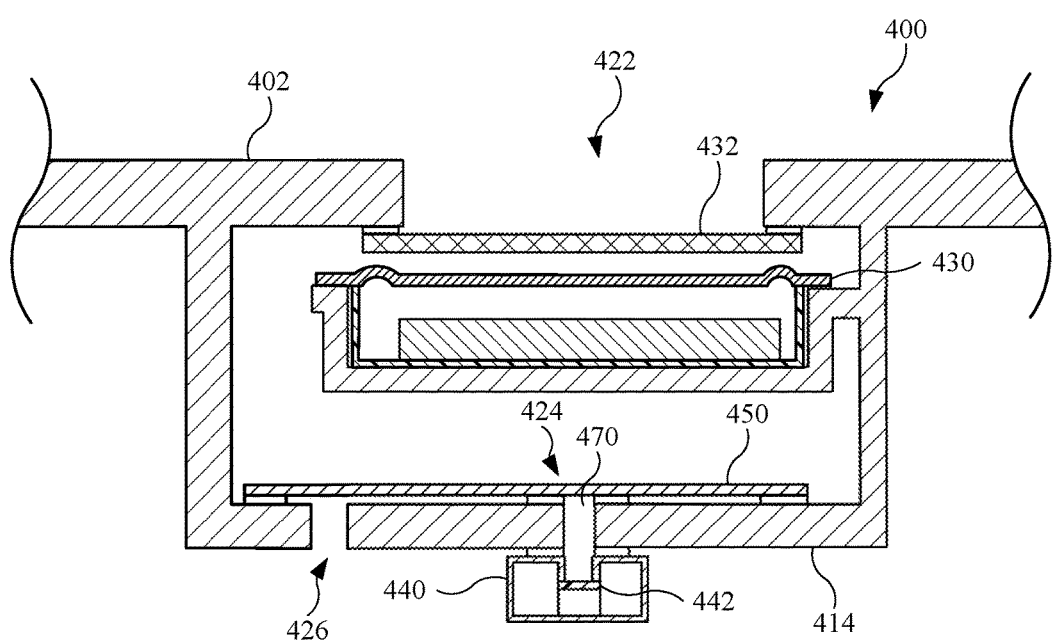
FIG. 8 illustrates a cross sectional view of an alternate embodiment of an electronic device, showing the pressure sensor disposed behind an operational component, in accordance with the described embodiments.

FIG. 8 illustrates a cross sectional view of an alternate embodiment of an electronic device 400, showing a pressure sensor 440 disposed behind an operational component 430, in accordance with the described embodiments. The operational component 430 may include an audio speaker covered by a porous material 432, such as mesh. Although not shown, the operational component 430 may include a microphone. As shown, the pressure sensor 440 is secured with an internal wall 414 of the enclosure 402 and may be positioned in a manner such that the operational component 430 is positioned between an external opening 422 (of the enclosure 402) and the pressure sensor 440. As shown, the internal wall 414 may include several internal openings. For example, the internal wall 414 includes a first internal opening 424 that defines an air pocket 470 to expose the pressure sensor 440 to air received by the external opening 422. The internal wall 414 may further include a second internal opening 426 that allows air to flow into or out of an internal volume (not shown) defined by the enclosure 402. The internal wall 414 may also include a membrane 450 secured with the internal wall 414 by a waterproof adhesive, with the membrane 450 covering the internal openings to provide an air-permeable, water-resistant barrier that prevents the flow of aqueous-based solutions from passing through the internal openings. Also, the pressure sensor 440, and in particular, a diaphragm 442, may use air received by the external opening 422 and passing through the membrane 450 and the air pocket 470 to detect air pressure exerted on the electronic device 400. Further, the air pocket 470 may include a size significantly smaller than that of the internal volume such that an amount of air passing through the air pocket 470 causes a greater pressure change in the air pocket 470, as compared to the internal volume. Also, although not shown, the pressure sensor 440 may be mounted on a circuit board or a flexible circuit to place the pressure sensor 440 in electrical communication with a processor circuit, as a non-limiting example. In this manner, the pressure sensor 440 can communicate with the processor circuit to provide pressure information to the processor circuit in any manner previously described.

Figure 9:
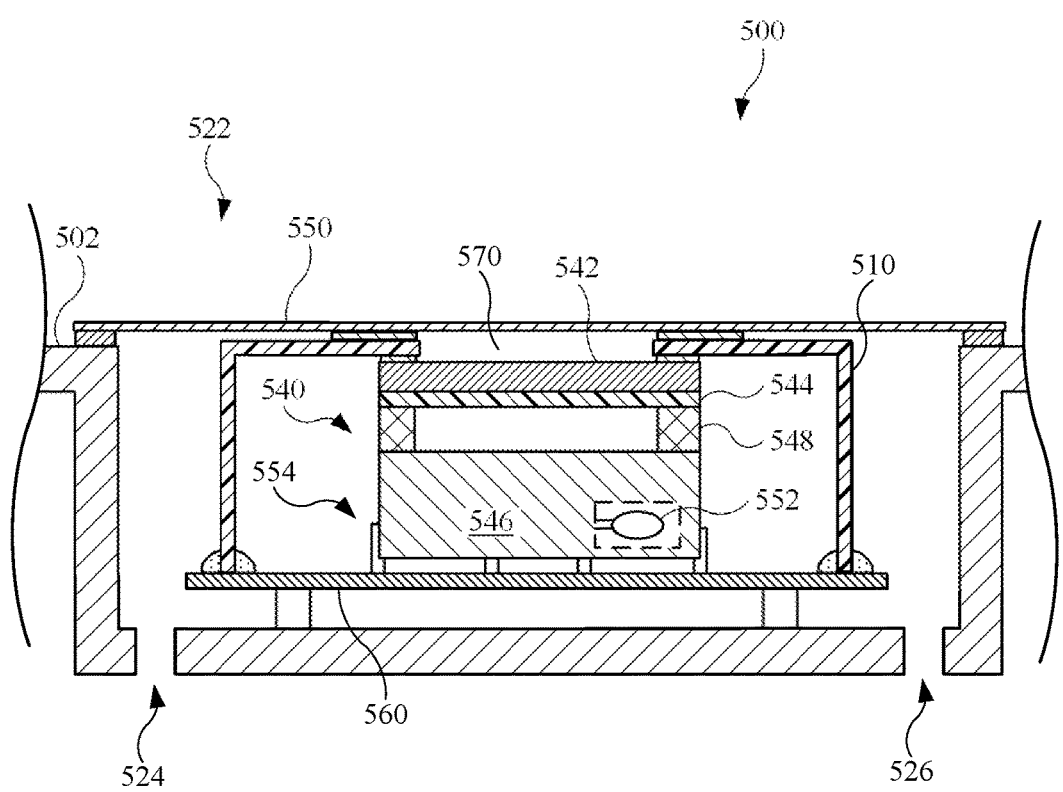
FIG. 9 illustrates a cross sectional view of an alternate embodiment of an electronic device, showing a pressure sensor and a membrane secured with an enclosure of the electronic device.

FIG. 9 illustrates a cross sectional view of an alternate embodiment of an electronic device 500, showing a pressure sensor 540 and a membrane 550 secured with an enclosure 502 of the electronic device 500. The enclosure 502 may include any feature or features previously described for an enclosure. For example, the enclosure 502 may include multiple internal openings, such as a first internal opening 524 and a second internal opening 526, that allow air to flow into or out of the internal volume (not shown) of the electronic device 500. Further, the enclosure 502 may form a recessed region 522 to receive the pressure sensor 540. Also, a membrane 550 may cover the pressure sensor 540 to provide an air-permeable, water-resistant barrier that prevents the flow of aqueous-based solutions from contacting the pressure sensor 540. Also, the membrane 550 may be adhesively secured with the enclosure 502 by way of a waterproof adhesive. The pressure sensor 540 may include a shield 510 (or can) that adhesively secures with the membrane 550 by way of an airtight adhesive. The shield 510 can provide an mechanical shield as well as electromagnetic interference ("EMI") shield.

The pressure sensor 540 may further include a diaphragm 542 exposed to ambient air passing through the membrane 550. In this regard, the shield 510 includes an opening to allow air to reach the diaphragm 542. Also, the recessed region 522 may receive a circuit board 560 in electrical communication with the pressure sensor 540.

The diaphragm 542 may be designed to actuate by bending or flexing in response to a pressure change based upon air received by the diaphragm 542 through the opening of the shield 510. The diaphragm 542, and other embodiments of a diaphragm described herein, may include a material or materials that bends or flexes in response to a pressure change at the diaphragm 542 approximately in the range 1-5 pounds per square inch ("psi"). Accordingly, the diaphragm 542, and other diaphragms described herein, may bend in response to a pressure change at or within the aforementioned pressure range and/or a pressure greater than 5 psi.

The diaphragm 542 may be sealed with the shield 510 by, for example, a pressure sensitive adhesive, silicone rubber, a gasket or an O-ring. Also, a waterproof seal may seal the shield 510 with the circuit board 560. In this manner, when the diaphragm 542 is formed from a waterproof material, the components of the pressure sensor 540 surrounded by the shield 510, the diaphragm 542, and the circuit board 560 are protected from liquid contaminants, such as water or some aqueous-based solutions. Also, the shield 510 may be electrically coupled with the circuit board 560 in order to provide at least part of an electrical grounding path for the pressure sensor 540.

The pressure sensor 540 may further include a detection mechanism 544 designed to bend or flex along with the diaphragm 542 when the diaphragm 542 bends or flexes in response a pressure change. In some embodiments, the detection mechanism 544 is embedded in the diaphragm 542. In the embodiment shown in FIG. 9, the detection mechanism 544 is coupled with the diaphragm 542. Also, in some embodiments, the detection mechanism 544 is a strain gauge designed to change an electrical resistance in response to a bending or flexing of the diaphragm 542. Accordingly, the detection mechanism 544 may receive electrical current and provide an electrical resistance that changes with the bending or flexing of the detection mechanism. In other embodiments, the detection mechanism 544 is a capacitive sensor designed to change a capacitance level in response to a bending or flexing of the diaphragm 542. Still, in other embodiments, the detection mechanism 544 is an ultrasonic sensor that uses sound waves to detect a bending or flexing of the diaphragm 542. In any event, the detection mechanism 544 may be designed to provide an output, including an electrical output, by bending or flexing with the diaphragm 542. The output may be used to determine the pressure exerted on the electronic device 500, and in particular, the diaphragm 542. As non-limiting examples, the electrical output may take the form of an electrical pulse that varies in frequency corresponding to the amount of bending or flexing of the diaphragm 542. Alternatively, the electrical output may take the form of an analog signal that varies in electrical current corresponding to the amount of bending or flexing of the diaphragm 542.

The pressure sensor 540 may further include a processor circuit 546 designed to receive the electrical output from the detection mechanism 544. In some embodiments, the processor circuit 546 includes a MEMS chip. As shown, the processor circuit 546 is separated from the detection mechanism 544 by a spacer element 548. Further, the processor circuit 546 may be electrically coupled with the detection mechanism 544 via the spacer element 548, or another feature (not shown) embedded in the spacer element 548. The processor circuit 546 may use the electrical output from the detection mechanism 544 to determine a pressure exerted on the diaphragm 542. Also, as shown in a partial internal view, the processor circuit 546 includes an air pocket 552 used by the processor circuit 546 as a reference pressure. In some embodiments, the air pocket 552 provides the processor circuit 546 with an absolute pressure. Accordingly, the pressure as determined by the pressure sensor 540 may be compared with a reference pressure. Also, as shown, the processor circuit 546 includes several pins 554 to electrically couple the processor circuit 546 with the circuit board 560. Also, in some embodiments (not shown), the pressure sensor 540 includes an application-specific integrated circuit (ASIC) that executes instructions from a program or algorithm stored on the ASIC chip and combines with the processor circuit 546 to determine the pressure based on the electrical output from the detection mechanism 544. The ASIC chip may, in some cases, substitute for the processor circuit 546.

Similar to previous embodiments, the pressure sensor 540 may be provided with an air pocket 570 that includes a relatively small volume, as compared to the internal volume (not shown) of the enclosure 502. For example, the air pocket 570 may be defined by a volume or space between the membrane 550 and the diaphragm 542. Further, the air pocket 570 may include a size significantly smaller than that of the internal volume such that an amount of air passing through the air pocket 570 causes a greater pressure change in the air pocket 570, as compared to the internal volume. In this manner, the diaphragm 542 is limited in exposure to a small volume such that low (or minimal) air movement can cause a relatively high pressure change, causing the diaphragm 542 to respond faster than by using air circulating throughout the internal volume of the enclosure 502.

Figure 10:
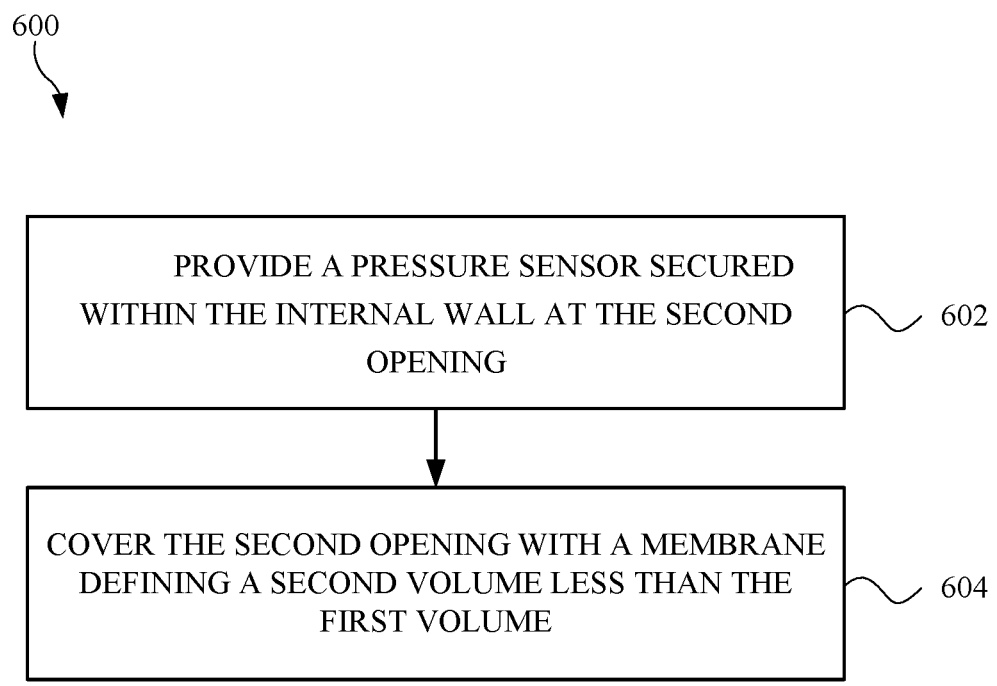
FIG. 10 illustrates a flowchart showing a method for venting an electronic device having an enclosure having a first opening and a second opening, in accordance with the described embodiments.

FIG. 10 illustrates flowchart 600 showing a method for forming an electronic device, in accordance with the described embodiments. The electronic device may include an enclosure having a rear wall and sidewalls that combine with the rear wall to form a first volume. The first volume is configured to carry operational components such as a processor circuit, a memory circuit, a speaker module, a microphone, and a battery, as non-limiting examples. Also, the sidewalls include a sidewall having a first opening. Also, the enclosure may further include an internal wall hidden by the sidewall and having a second opening.

In step 602, a pressure sensor is provided secured within the internal wall at the second opening. The pressure sensor is configured to detect air pressure from air entering or exiting the second opening. The second opening may receive ambient air from the first opening. Further, the pressure sensor may include a diaphragm aligned with the second opening such that the diaphragm bends or flexes in response to pressure changes within the second opening.

In step 604, the second opening is covered with a membrane defining a second volume less than the first volume. The membrane may include a water-resistant, air-permeable membrane designed to allow air through the membrane but prevent liquid ingress. Further, the membrane may combine with the second opening and the pressure sensor to define an air pocket. The pressure sensor may detect pressure based on air within the second volume. Further, the pressure sensor may detect pressure based on air within the air pocket.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
an enclosure defining a first volume;
a pressure sensor secured to a wall of the enclosure, the pressure sensor including a diaphragm; and
an air-permeable membrane covering an opening in the wall to define a second volume between the diaphragm and the air-permeable membrane that is less than the first volume, wherein the pressure sensor detects pressure based on air within the second volume.

2. The electronic device of claim 1, wherein the enclosure comprises a second opening that allows air to flow into the first volume.

3. The electronic device of claim 2, wherein the enclosure further comprises a third opening that allows air to flow into the first volume and the second volume.

4. The electronic device of claim 1, wherein the air-permeable membrane is water-resistant.

5. The electronic device of claim 1, wherein the enclosure comprises:
an external sidewall having an external opening, the wall being disposed behind the external opening within the enclosure.

6. The electronic device of claim 5, further comprising an operational component that uses the external opening for audio transmission.

7. The electronic device of claim 1, wherein the pressure sensor detects pressure based on flexure of the diaphragm.

8. An electronic device, comprising:
an enclosure comprising a rear wall and sidewalls that combine with the rear wall to define an internal volume, the sidewalls including a sidewall having an external opening, the enclosure further comprising an internal wall covered by the sidewall and having an internal opening; and
a pressure sensor secured within the enclosure proximate the internal opening, wherein the pressure sensor combines with the internal opening and an air-permeable membrane covering the internal opening to define an air pocket having a volume less than the internal volume, and wherein the pressure sensor is configured to detect air pressure based on air within the air pocket.

9. The electronic device of claim 8, wherein the internal wall comprises a second internal opening, the second internal opening covered by the air-permeable membrane.

10. The electronic device of claim 8, wherein the pressure sensor comprises a diaphragm that bends in response to a pressure change within the air pocket.

11. The electronic device of claim 8, further comprising an operational component disposed between the sidewall and the internal wall, the operational component positioned to use the external opening for audio transmission.

12. The electronic device of claim 11, wherein the operational component comprises a microphone.

13. The electronic device of claim 11, wherein the operational component comprises an audio speaker.

14. A method for forming an electronic device having an enclosure comprising a rear wall and sidewalls that combine with the rear wall to form a first volume, the sidewalls comprising a sidewall having a first opening, the enclosure further comprising an internal wall hidden by the sidewall and having a second opening, the method comprising:
providing a pressure sensor secured within the internal wall at the second opening; and
covering the second opening with an air-permeable membrane defining a second volume between the pressure sensor and the air-permeable membrane that is less than the first volume, wherein the pressure sensor detects pressure based on air within the second volume.

15. The method of claim 14, wherein the air-permeable membrane is water-resistant.

16. The method of claim 14, wherein the pressure sensor detects pressure based on air entering and exiting the second volume through the air-permeable membrane.

17. The method of claim 16, wherein the second volume is bound by the air-permeable membrane, the second opening, and the pressure sensor.

18. The method of claim 14, wherein the air-permeable membrane is adhesively secured with the internal wall by an airtight adhesive.

19. The method of claim 14, wherein the pressure sensor comprises a diaphragm that bends in response to a pressure change within the second volume.

* * * * *